June 16, 1931.  W. J. FIEGEL ET AL  1,809,838
METHOD OF MANUFACTURING BEARINGS
Filed Jan. 3, 1928  2 Sheets-Sheet 1
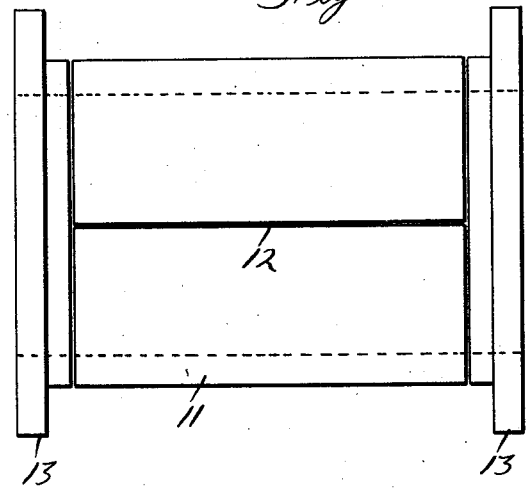
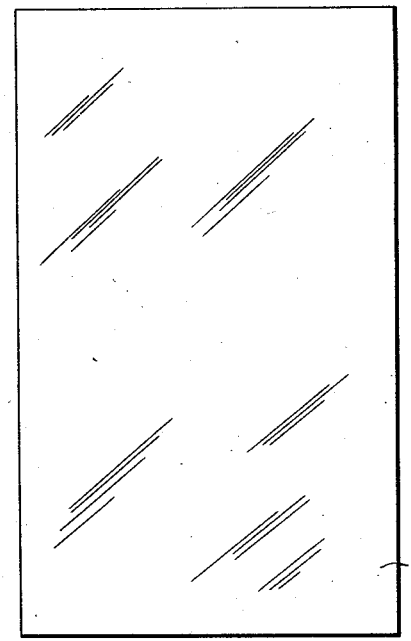
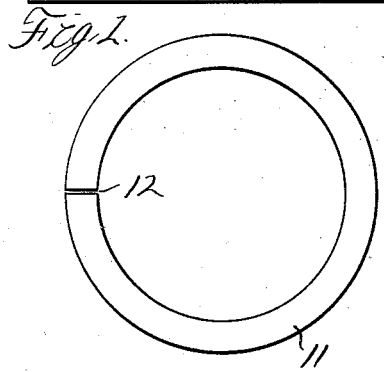
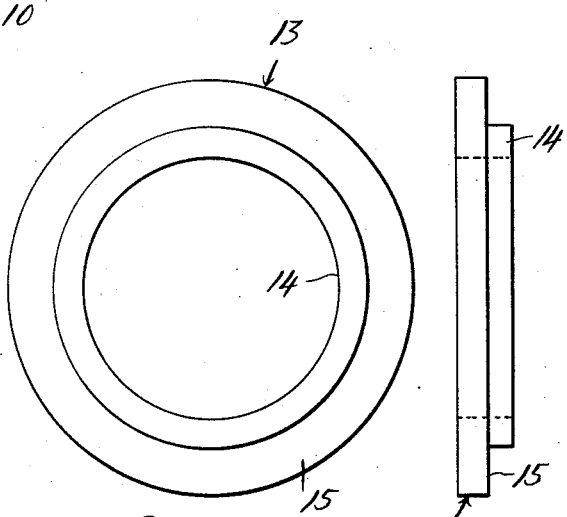
Inventors
William J. Fiegel
Frederick C. Jones June 16, 1931.  W. J. FIEGEL ET AL  1,809,838
METHOD OF MANUFACTURING BEARINGS
Filed Jan. 3, 1928    2 Sheets-Sheet 2
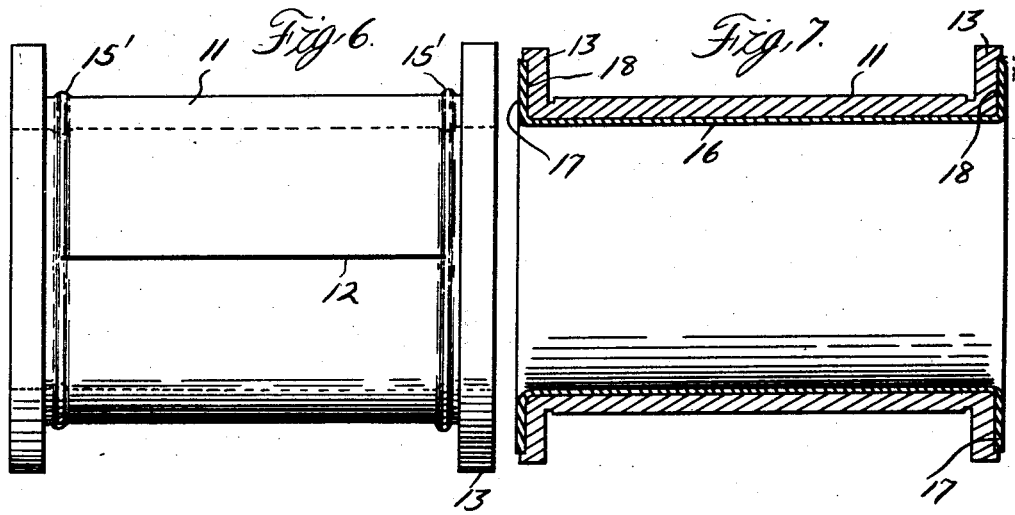
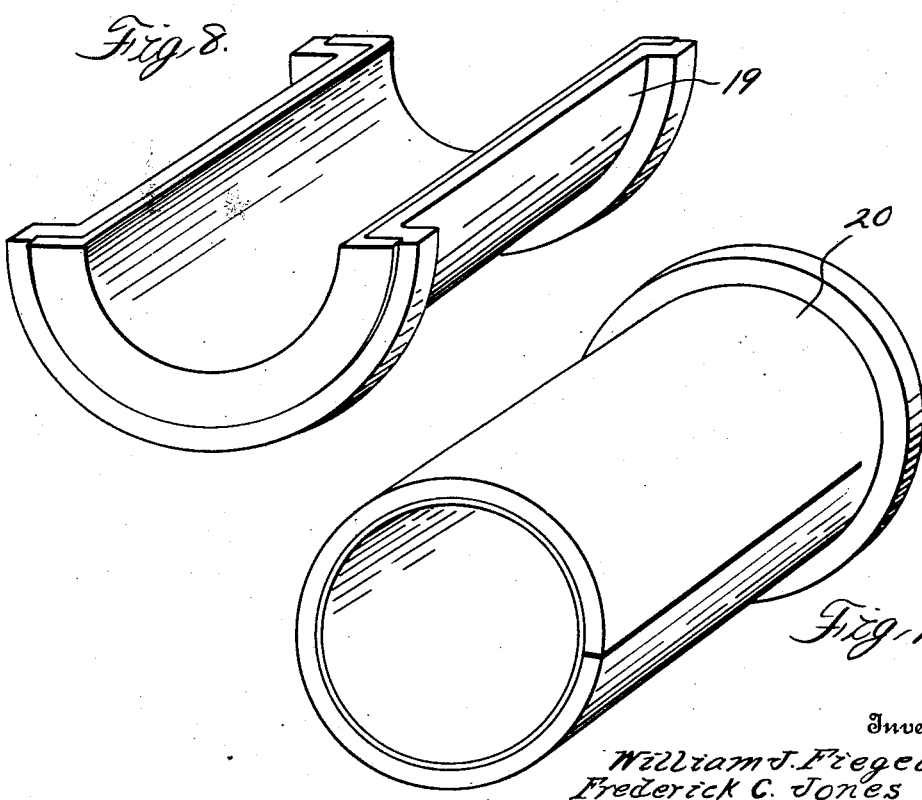
Inventors
William J. Fiegel
Frederick C. Jones Patented June 16, 1931

1,809,838

UNITED STATES PATENT OFFICE

WILLIAM J. FIEGEL AND FREDERICK C. JONES, OF DETROIT, MICHIGAN, ASSIGNORS TO BOHN ALUMINUM AND BRASS CORPORATION, OF DETROIT, MICHIGAN, A CORPORATION OF MICHIGAN

METHOD OF MANUFACTURING BEARINGS

Application filed January 3, 1928. Serial No. 244,287.

This invention relates to bearings and to a method of manufacturing the same and more particularly to flanged bearings and to an improved method of producing this type of bearings.

The invention relates particularly to an improved method of manufacturing bearing backs for flanged bearings and contemplates pre-forming a tubular body, pre-forming a flange member or a pair of flange members and subsequently uniting said member or members to one or both ends respectively of the tubular body. With such a method it is possible to manufacture steel back bearings or backs for bearings of a material which can not be conveniently cast. By reason of the present invention it is also possible to pre-form the flanges in any desired or preferred manner of any desired material similar to or different from the tubular body portion of the bearing backs.

The several objects, advantages and novel details of construction of this invention together with the several steps of our improved method will be made more apparent as this description proceeds especially when considered in connection with the accompanying drawings wherein:

Figure 1 is a plan view of the material from which the tubular body member is pre-formed.

Figure 2 is an end elevation of the pre-formed tubular body member.

Figure 3 is a front elevational view of the flanged member pre-formed.

Figure 4 is a side elevation of the member shown in Figure 3.

Figure 5 is a side elevational view of the flange members associated with the tubular body member before these parts have been united.

Figure 6 is a view of the parts illustrated in Figure 5 after the same have been united.

Figure 7 is a sectional view through a completed bearing after babbitting.

Figure 8 is a perspective view of a babbitted half bearing, and

Figure 9 is a perspective view of a single flange tubular bearing.

In carrying out our improved method, a sheet of material 10 such as illustrated in Figure 1 is formed in any desired manner to form a tubular body member 11 such as illustrated in end elevation in Figure 2. The sheet of material 10 may be formed into the tubular body 11 in any desired manner such as by pressing, stamping, rolling or any other forming operation. Likewise the invention contemplates the use of a tubular body member cut from a pre-formed tube into proper length. In forming the tubular body member 11 the edges of the sheet 10 are brought together into abutting or substantially abutting relation to form the longitudinally extending seam or joint 12. While this invention finds particular utility in manufacturing steel back bearings, in which case the sheet of material 10 is to be made of steel, nevertheless the tubular body members may be made in any desired or preferred material as will be immediately obvious.

In Figures 3 and 4 a pre-formed flange member 13 is illustrated, this flange member being formed of any desired material similar to or different from the material of which the tubular body is made. The flange members may be pre-formed in any desired manner, as for instance, by rolling the same from a strip of material; or casting the same; or for instance they may be made of stampings, machined or unmachined as found to be desirable or expedient. In the embodiment of the invention herein illustrated each flange member is substantially L-shaped in cross section to provide a laterally extending base or leg 14 of a diameter substantially coincident with that of the tubular body 11 and with an outwardly radially extending flange 15.

In making a bearing flanged at both ends a pair of flange members 13 are associated with the tubular body member 11 as illustrated in Figure 5; that is the ends of the base or leg 14 of each flange member is brought into engagement with the respective ends of the tubular body 11. In Figure 5 the flange members 13 are shown as arranged in abutting relation with the ends of the tubular body member 11 whereupon the flange members may be rigidly permanently secured to the tubular body 11 as for instance by welding, the lines of weld being indicated in Figure 6 by the reference character 15'. Obviously when the outer surface of the bearing back is later machined these ridges or uneven surfaces at the lines of weld are removed. This invention, however, contemplates uniting the flange members with the body member in any other desired manner. For instance, the flanges may be secured to the body member by being pressed or seamed thereon or by brazing or sweating the same thereto. Furthermore the engaging surfaces may be tinned and the flanges united with the body by the bond provided by the tin. Also it is possible to cast the flanges on to the ends of the tubular body member, the invention contemplating any means whereby the flanges are permanently rigidly united with the body.

In Figure 7 a bearing flanged at both ends and babbitted as at 16 is shown partially in longitudinal section and partially in elevation. In this view the babbitt is shown as extending around the ends of the bearing and on to the outer faces of the flanges as indicated at 17. When the bearing backs are babbitted in this manner the outer faces of the flanges are countersunk or recessed as indicated at 18 to receive a coating of babbitt on the faces thereof.

In Figure 8 a half bearing 19 is illustrated which may be produced by the herein described method by practicing the further step of severing the whole bearing in half longitudinally thereof along a line coincident with the seam 12.

With the present invention, when employed in the manufacture of half bearings the bearings may be made oversize in the manner described and claimed in United States Letters Patents Numbered 1,554,493 dated September 22, 1925 and 1,402,849 dated January 10, 1922. Accordingly such bearings may be made interchangeable as well as of standard construction.

In Figure 9 a tubular bearing 20 having a single flange is illustrated. Such bearings may be manufactured in accordance with the provisions of this invention but under such conditions only one flange member 13 will be attached to the tubular body member 11.

Reservation is made to make such changes in the details of construction and in the several steps of the method as well as the sequence of such steps as may come within the purview of the accompanying claims.

What we claim as our invention is:—

1. In the method of manufacturing backs for flanged half bearings, those steps which consist in shaping a flat sheet by forming operations to produce a tubular body, pre-forming by suitable operations a flange member having a laterally extending base of a diameter substantially coincident with that of said tubular body, connecting said parts by means which results in a fusion or integration of the material thereof and longitudinally severing the structure into halves.

2. In the method of manufacturing backs for flanged bearings, those steps which consist in shaping a flat sheet by forming operations to produce a longitudinally split tubular body, pre-forming by suitable operations an integral flange member having a laterally extending base of a diameter substantially coincident with that of said tubular body, connecting the edge of the base of said flange member to the end of said tubular body by means acting to cause a fusil union between the parts, and halving the structure by severing the same longitudinally on a plane coincident with said split.

3. In the method of forming backs for flanged bearings, those steps which consist in shaping a flat sheet of material into a cylindrical body having a longiudinal split, pre-forming a flange member to provide a ring-like member substantially L-shaped in cross section with the base of the L of substantially the same diameter as said cylindrical body, bringing the base of said flange member into engagement with the end of said body, permanently integrating said engaging portions, and forming the structure into half-bearings by severing the same along a line coincident with said split.

4. In the method of forming flanged half bearings, those steps which consist in shaping a flat sheet of material into a cylindrical body, pre-forming a flange member to provide a ring-like member substantially L-shaped in cross section with the base of the L of substantially the same diameter as said cylindrical body, uniting said body and flange member by butt-welding the edge of the base of said flange member to the end of said body babbitting the inner surface of the resulting structure, and severing the structure in half longitudinally thereof.

5. The method of forming a bearing which consists in shaping a flat sheet of material into a cylindrical body, pre-forming a flange member with a recess in one face, securing said flange member to the end of the said tubular member, and babbitting the inner periphery of the said tubular member and the inner periphery and recessed face of the said flange member.

In testimony whereof we affix our signatures.

WILLIAM J. FIEGEL.
FRED C. JONES.